United States Patent

[11] 3,628,317

| [72] | Inventor | Lester C. Lederer<br>Rt. 1, Box 226, Willows, Calif. 95988 |
|---|---|---|
| [21] | Appl. No. | 56,316 |
| [22] | Filed | July 20, 1970 |
| [45] | Patented | Dec. 21, 1971 |

[54] HARVESTER HEADER
8 Claims, 8 Drawing Figs.

[52] U.S. Cl....................................... 56/219,
56/158, 56/14.4
[51] Int. Cl....................................... A01d 57/02
[50] Field of Search........................... 56/219–227,
153, 158, 164, 13.3, 14.5, 14.6, 14.4,
16.3, 14.3

[56] References Cited
UNITED STATES PATENTS

| 2,795,920 | 6/1957 | Steuerwald.................. | 56/221 |
| 3,077,719 | 2/1963 | Elder, Sr...................... | 56/219 |
| 3,217,473 | 11/1965 | Lawrie.......................... | 56/14.4 |
| 3,472,008 | 10/1969 | Hurlburt....................... | 56/226 |

FOREIGN PATENTS

| 635,810 | 9/1936 | Germany...................... | 56/219 |
| 636,753 | 3/1962 | Italy............................. | 56/219 |

*Primary Examiner*—Russell R. Kinsey
*Attorney*—Boyken, Mohler, Foster & Schwab

ABSTRACT: A harvester header is a leading portion of a mechanized harvester which gathers in grain or the like growing in the field, severs the grain near ground level, feeds the grain toward a central point usually by an auger-type feeder from which central point the grain is conveyed away for some further operations such as threshing.

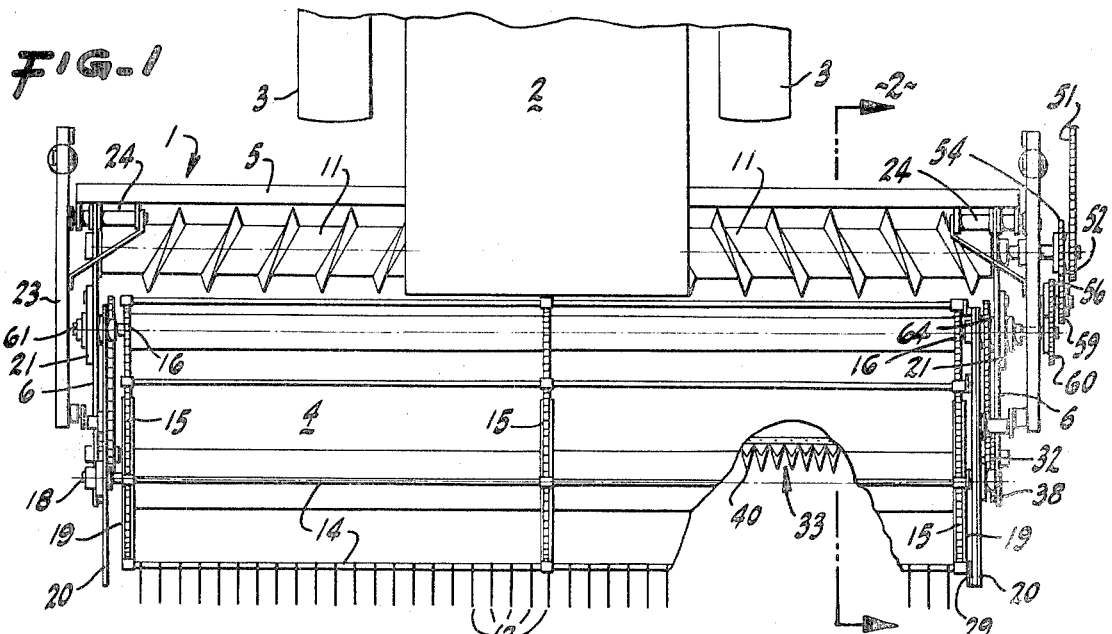
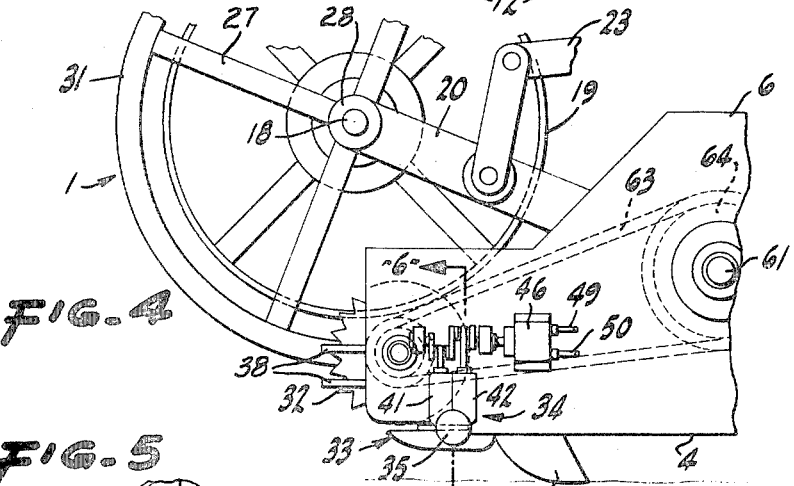
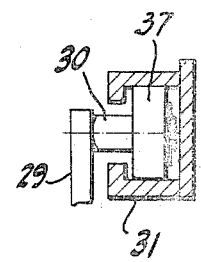
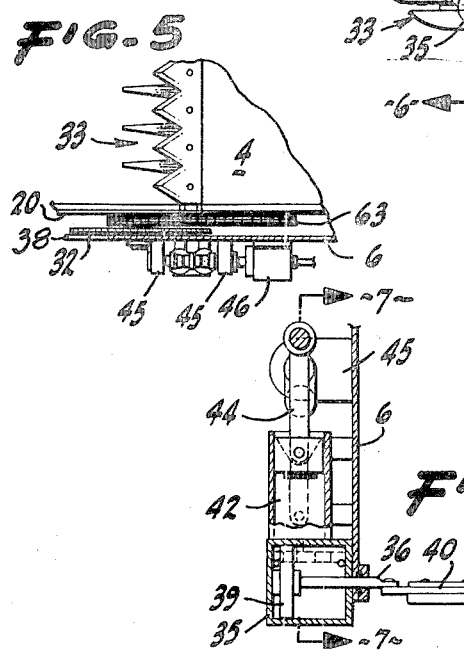
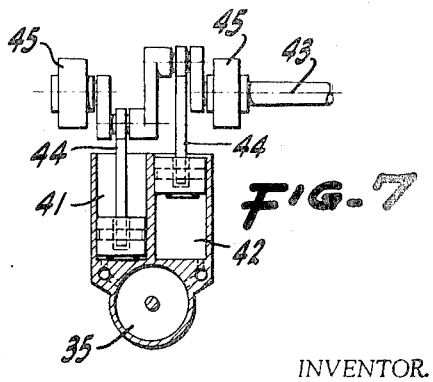
INVENTOR.
LESTER C. LEDERER
BY Buckhorn, Mohler, Foster & Schwab
ATTORNEYS

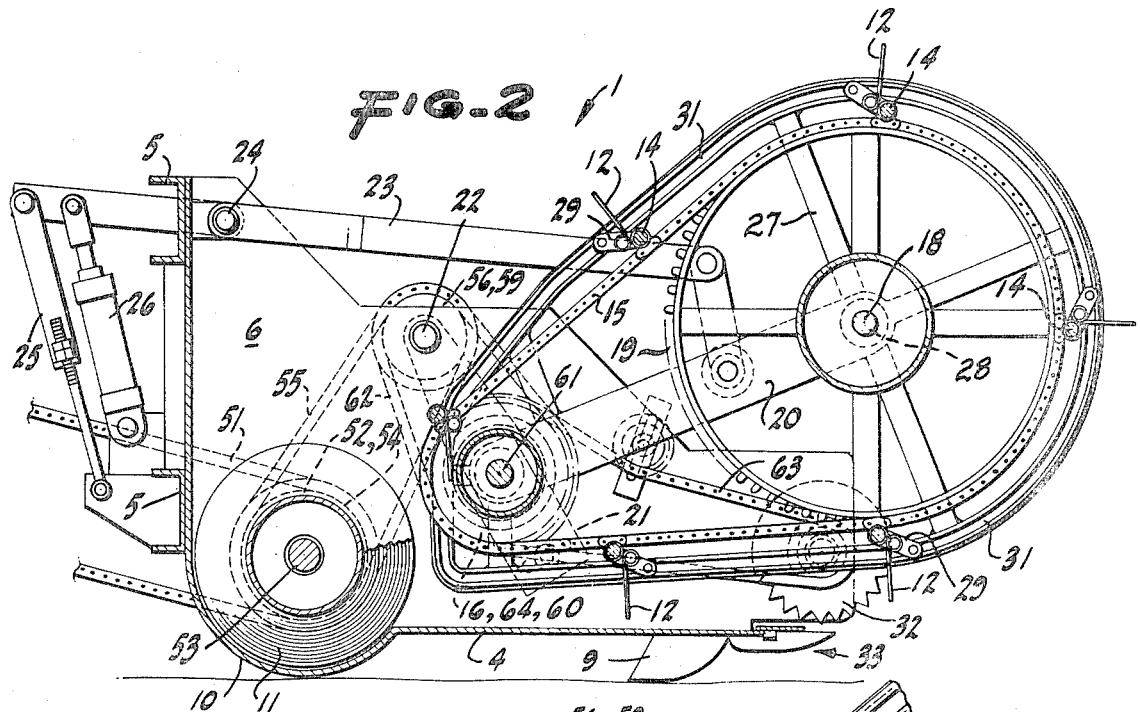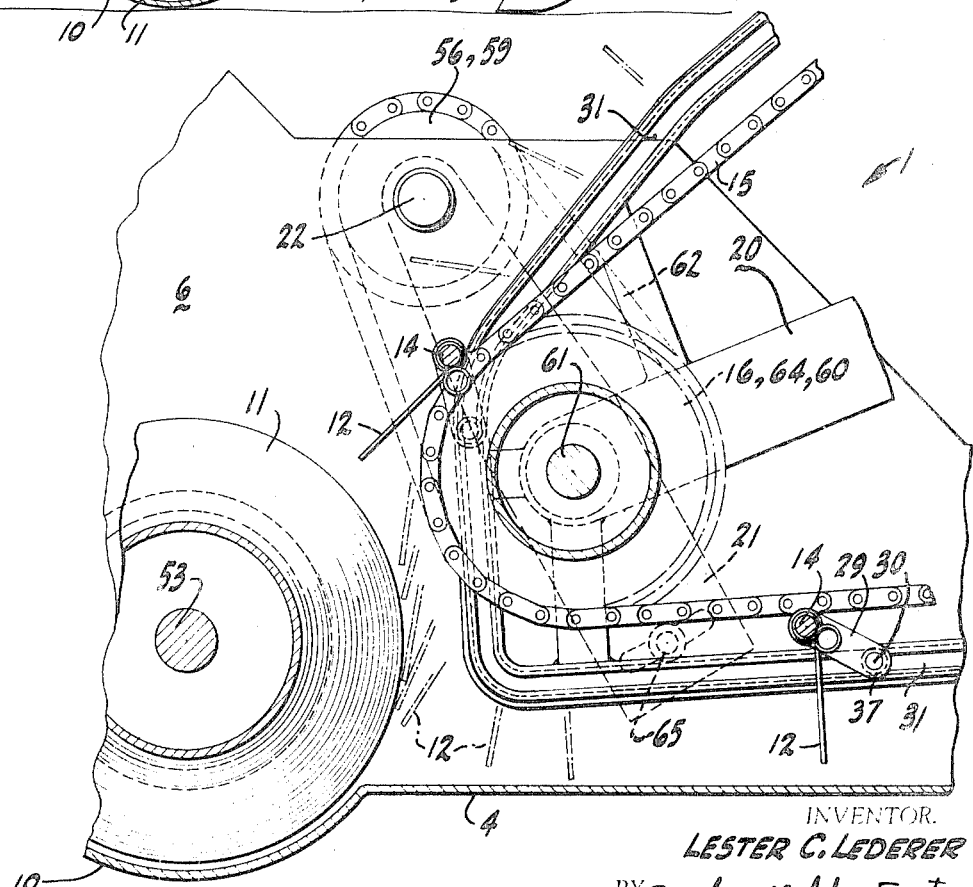

HARVESTER HEADER

SUMMARY OF THE INVENTION

The improvements of the present invention are directed toward control of the stalks of grain from above and below as they are being raked into the header during harvesting, uniform orientation of the stalks of grain as they are being raked into the header, severance of the stems of the grain before they are being worked on by the feeding augers and minimizing of fouling of the operating parts as a header is being driven through a field of grain. To accomplish the objectives of grain control, orientation and stem severance prior to the grain being engaged in the feeding augers, the revolving picker reel in the present invention has been moved forwardly a considerable distance to allow a longer time interval between the time the grain is engaged by the pickers for raking into the header and when the grain is engaged by the feeding augers. Other structural changes enabled by moving the picker reel forwardly allow for orientation and control of the grain until it is within inches of being engaged by the augers.

A hydraulic cutter bar actuating mechanism and the elimination of the grain divider and substitution therefor of a cutting wheel contributes substantially to the elimination of fouling of the operating parts.

BACKGROUND OF THE INVENTION

In past header constructions, the picker reel has been located rather closely adjacent the feed augers resulting in the grain very often being engaged by and worked by the feed augers prior to the time the stem had been severed. This caused several problems. The grain was not uniformly oriented when it was engaged by the feeding augers and this disorientation was maintained throughout the time the grain was being worked on by the harvester. Grain would occasionally be pulled out of the ground rather than having its stem severed causing dust and fouling at the cutter bar. The disorientation of the grain in the auger caused the auger to ride over much of the grain trapped between the auger blade and the pan down below creating a substantial amount of dust and a certain degree of destruction to the crop and machinery.

In the present invention, the grain is raked into the header in a constant head first orientation and the stem of the grain is fully severed before it reaches the auger. This means that the grain is free to be worked by the auger when engaged thereby and it is of a constant orientation throughout processing. Dust is minimized since the grain is free from any restraints throughout the time it is being processed by the header.

In the past, cutter bar driving mechanisms have operated on a reciprocating principle. The reciprocating members were located outside the limitations of the header and functioned to rip up or beat down a path of grain as much as 8 inches wide. Applicant provides a hydraulic cutter bar operating mechanism in the present application which protrudes outwardly of the header only about half as much as prior operating mechanisms and the operation of which does not act as a collector of grain being passed. Thus, a source of dust and malfunctioning is substantially eliminated.

In the past headers have included dividers which protrude forwardly of the cutter bar, the function of which was to divide the grain which was to be raked into the header and cut on a given pass of the harvester from that which was to pass outside of the header. The stalks of grain often become tangled near their upper ends and in this event prior dividers would simply rip the stalk out of the ground and the intertwined stalks would ride upwardly along the divider blade building up to the point that they would eventually cause malfunctioning of the picker reel and other parts. The action of the divider also created a substantial amount of dust.

In the present invention, applicant provides a cutting blade in place of a divider which, if necessary, will cut tangled grain apart leaving the severed ends to pass either inwardly or outwardly of the header. This eliminates the damaging ripping action of the divider blade and the resulting dust and malfunctioning of the machinery caused by ripping out tangled stalks of grain.

It is, therefore, an object of the present invention to provide a header in which the stem of the grain is severed before the head of the grain reaches the auger for working thereby.

Another object of the present invention is to provide a header wherein the grain is controlled from both the top and the bottom over a greater period of time as it is being raked into the header thereby facilitating orientation of the grain prior to the time the grain is engaged by the auger.

It is a further object of the present invention to provide a header in which the dead, or uncontrolled, space between the auger and the engagement of the grain by the pickers of the reel is minimized.

Still another object of the present invention is to provide driving mechanisms which are protected from being fouled by passing grain and which do not themselves destroy a path of grain being passed.

Yet another object of the present invention is the replacement of the divider blade with more efficient means for separating the grain which is to be included within the header and that which is to pass outside thereof.

Another object of the present header is to minimize problems of dust and to protect the soil by eliminating the pulling of grain therefrom by its roots.

The above and other objects will be apparent from the following description taken in conjunction with the drawings in which:

FIG. 1 is a top plan view of the header of the present invention diagrammatically illustrating its attachment to the front portion of the tractor;

FIG. 2 is a cross-sectional view taken substantially along line 2—2 of FIG. 1;

FIG. 3 is an enlarged, fragmentary view of a portion of the mechanism illustrated in FIG. 2;

FIG. 4 is a side elevational view of the hydraulic operating mechanism of the cutter bar of the present invention;

FIG. 5 is a top plan view of a portion of the structure illustrated in FIG. 4;

FIG. 6 is an enlarged cross-sectional view taken substantially along line 6—6 of FIG. 4;

FIG. 7 is a cross sectional view taken substantially along line 7—7 of FIG. 6; and FIG. 8 is an enlarged cross-sectional view of a cam track showing a cam follower restrained therein.

The header of the present invention, generally designated 1 in FIG. 1, can be used with any conventional harvester for harvesting grain, a thresher for separating grain from stalks and baling the latter, a swather for orienting and redepositing the oriented straw on the ground behind the harvester, or the like. The tractor is not shown in detail since the means for connecting the header to a tractor are conventional and vary slightly from model to model and manufacturer to manufacturer. In FIG. 1 a conveyor tunnel is indicated at 2 which would lead up to a thresher or baler or the like and the portion of the wheels of the tractor are indicated at 3 to show in general the relationship between the header and the tractor.

As seen in FIGS. 1, 2 and 3, header 1 includes a platform or pan member 4 which is supported by a plurality of cross frame members such as 5 and sidewalls 6. The platform and its supporting structure is connected to the forward end of a self-propelled tractor and is supported slightly above the soil surface of a field through which the tractor may move. In the usual construction the platform can be raised and lowered to accommodate varying situations and is generally provided with some form of a skid 9 to prevent the leading edge of the platform from digging into the soil over which it is passed. The means for raising and lowering the entire platform is conventionally hydraulic and is not shown herein.

Rearwardly of the platform and received in a complimentarily formed concaved portion 10 of pan 4 are conventional, rotatable feed augers 11; one to each side of the feed elevator housing conveyor tunnel 2; each auger being adapted to feed grain centrally toward the conveyor tunnel. Augers 11 are mounted in appropriate bearings in sidewalls 6 and are usually driven by chain and sprocket means that will be described later in greater detail.

In the usual header a reel is rotatably mounted forwardly of the feed augers extending substantially the width of the header with slats or pickers mounted thereon for engaging and raking grain under the reel and into the feed augers. In the present invention, there is no reel as such for raking grain into the augers. Pickers such as the spring prong type 12 illustrated in FIG. 3 are mounted at spaced intervals across the width of the header (FIG. 1) on rods 14 or the like which extend substantially the width of header 1 and are in turn pivotally mounted at each of their ends on endless link-type chains 15. Each of the chains are received around a pair of sprocket guides, and inner sprocket guide 16 located just forwardly of the feed augers 11 and a much larger outer sprocket guide 19 being spaced outwardly thereof toward the front or leading edge of header 1.

Inner and outer sprockets 16 and 19 are mounted on a supplemental frame structure 20 which is in turn secured to an adjustable arm 21 which is pivotally mounted on sidewall 6 as by pivot 22. Both sets of sprocket guides are rotatably mounted and bear a fixed relationship to each other. Inner sprocket guide 16 is usually driven by a chain and sprocket drive mechanism which will be described later in greater detail, and outer sprocket guide 19 is driven by its connection with inner sprocket guide 16 through chains 15.

As opposed to the 4 or 5 foot diameter reels heretofore used in harvester combines, inner sprocket guide 16 is relatively small in diameter, usually not exceeding 12 inches. Because of its smaller size, inner sprocket guide 16 can be located much closer to feed augers 11 than has heretofore been the case with larger diameter reels.

As seen in FIGS. 1 and 2, supplementary frame members 20 are supported not only at pivot 61, but also by an arm 23 which is in turn supported by a pivot at one of the frame members 5. A portion of arm 23 extends rearwardly of said pivotal connection 24, said extension being adapted to be connected at the lower of said cross frame members 5 by means of a movement limiting device 25 and a raising and lowering device such as hydraulic cylinders 26. It can be seen that actuation of cylinder 26 will effect a raising and lowering of the supplemental frame members 20 and a structure mounted thereon while at the same time the lower limit of the movement of said structure can be defined by movement limiting device 25.

Each picker supporting rod 14 has complementarily mounted at each end thereof a crank arm 29 (FIGS. 1, 2 and 3), and at the end of each crank arm 29 opposite rod 14 and extending outwardly thereof is a camming pin 30 with a roller 37 at the end thereof. Pin 30 and roller 37 are adapted to be received within a cam track 31 (FIG. 8) which may be supported from arms 27 extending outwardly of hubs 28 which are supported on the shafts of sprocket wheels 16 and 19. It can be seen that the disposition of the prong-type pickers 12 throughout the movement of chain 15 in a clockwise direction is controlled by the engagement of camming pin 30 within cam track 31 which generally follows the path of chain 15.

As previously indicated, the conventional plow-type grain divider for defining the grain to be included within and without the limits of the header on a particular path of travel has been replaced on the present header. A power driven cutter blade 32 is rotatably mounted on the forwardmost edge of sidewalls 6 (FIGS. 2, 4, and 5). A sufficient portion of the cutter blade 32 protrudes forwardly of the leading edge of sidewalls 6 to engage and sever any stalks which might otherwise tend to gather across said front edge. Cutter blade guards 38 are mounted on the forwardmost edge of sidewalls 6 and extend outwardly therefrom adjacent cutter blade 32. Cutter blades 32, one on each sidewall 6, are power driven by the drive chain which will be described later.

An additional feature of the present header is an improved cutter bar drive mechanism. Power drive mechanisms have depended upon transmitting some form of circular motion into the reciprocal motion necessary to drive the sickle or cutter bar 33. In so doing, these devices have acted as a collecting point for stalks of grain being passed with the eventual result that the mechanism could be fouled.

On the present header, the inventor provides a mechanically actuated hydraulic drive means generally designated 34 in FIGS. 4 through 7. The hydraulic drive takes up only approximately half of the space outboard of sidewalls 6 as the previous reciprocating devices and can therefore be much more conveniently shielded from engagement with any passing stalks.

The hydraulic drive 34 includes a double-acting hydraulic cylinder 35 which is mounted on sidewall 6 outwardly thereof and in substantial longitudinal alignment with cutter bar 33, and a rod 36 connected to the piston 39 of cylinder 35 is operatively connected with the reciprocating, moving blade 40 of cutter bar 33.

Cylinder 35 is actuated by a pair of opposed hydraulic cylinders 41 and 42 operatively connected thereto, each of which has a capacity substantially equal to the capacity of double cylinder 35. Cylinders 41 and 42 are driven by crankshaft 43 which is connected to the pistons of said cylinders by means of pivotally supported connecting rods 44. Crankshaft 43 is mounted on the outer side of sidewalls 6 in bearings 45. The configuration of crankshaft 43 is such that cylinders 41 and 42 operate in opposition to each other and it can be seen that in such operation piston 39 of double-acting cylinder 35 is forced from one end to the other of said cylinder imparting a reciprocating motion to the blade 40 of cutter bar 33. A conventional pressure sensitive relief valve can be included anywhere in the hydraulic drive mechanism for the relief of hydraulic pressure should the cutter bar or the drive mechanism become jammed.

Crankshaft 43 is driven from any convenient power takeoff on the tractor and these vary from model to model. In the present instance, the inventor provides a conventional hydraulic motor 46 which is connected by lines 49 and 50 to any convenient point in the hydraulic system of the tractor.

It can be seen that the hydraulic drive 34 can assume other forms which can eliminate the crankshaft 43 in proximity to the leading edge of the header. Means for applying hydraulic pressure to each of the faces of piston 39 can be located at a point remote from the leading edge of the header and transmitted thereto by hydraulic lines, further eliminating moving mechanisms toward the leading edge of the conveyor which might tend to gather stray straw.

The drive mechanism for the header can be taken off of the tractor in a conventional manner. In the present instance the header is driven by a chain and sprocket arrangement wherein a chain 51 (FIG. 2) drives a sprocket 52 secured to the shaft of 53 on which feed augers 11 are mounted. Another sprocket 54 is secured to said shaft 53 and received therearound is a sprocket chain 55, which is also received around an idler sprocket 56 mounted on pivot 22. Another idler sprocket 59 is mounted on pivot shaft 22 and cooperates with a sprocket 60 secured to shaft 61, upon which inner sprocket 16 is mounted, to receive a chain 62. It will be recalled that inner sprocket 16 and outer sprocket 19 are connected by chain 15 which carries rods 14 and picker prongs 12.

Thus, it can be seen that the power derived from the tractor is transmitted first to the feed augers 11, then to idler sprockets 56 and 59 before being transmitted to inner sprocket 16 to drive the grain gathering and raking mechanism. The use of intervening idler sprockets 56 and 59 allow for the adjustability of the height of the gathering and raking mechanism which is also pivoted about pivot shaft 22, the shaft on which said idler sprockets are mounted. It is obvious that the operation of the present header is not restricted to the drive mechanism disclosed.

Cutter blade 32 can be driven by a chain 63 which is engaged between a sprocket secured for rotation with blade 32 and any other power point on the header. In the present instance, chain 63 is shown engaged around a sprocket 64 which is secured to the shaft 61 of inner sprocket 16. In such case, an adjustable idler sprocket is included along the run of chain 63 to allow for adjustments in the positioning of the grain gathering and raking mechanism.

A description of the operation will illustrate many of the advantages of the present header. As the header is driven by a tractor through a field of grain the pickers 12 function to engage the grain and draw it downwardly into the header and past the cutter bar 33. As opposed to most headers wherein the picker prongs are continually maintained in substantially vertical relationship, the prongs 12 of the present invention are controlled in their movements by the engagement of cams 30 and cam tracks 31 and reach over and out to engage the grain and draw it into the header. As the grain is drawn under the reel formed by the outer sprockets 19 and the chains 15 carrying rods 14 and picker prongs 12 it is laid out on the forward extension of pan 4. At this point, the individual stalks of grain may be raked by several sets of picker prongs 12 and is fairly consistently oriented along the forward extension of pan 4 with the grain all extending in the same direction.

Because of the manner in which the header is extended outwardly of the feed augers 11, the stalks of grain are severed near their bases by cutter bar 33 while they are under the complete control of the extension of pan 4 from beneath and the rows of picker prongs 12 from above and before they enter feed augers 11. Thus, there is no possibility that the grain will be worked by the feed augers before it is severed.

The forward sprockets 19 can be raised or lowered by the hydraulic cylinder 26 to accommodate the height of the grain in the particular field. This raising and lowering may be independent of any movement of inner sprockets 16. However, where a crop is very thick or full it is possible to loosen a bolt 65 which, when secured, restricts the movement of adjustable arm 21 about pivot 22, and raise or lower shaft 61 and sprocket 16 to increase or decrease the distance between the forward extension of pan 4 and the lower run of chains 15 to accommodate different crops.

In the usual header, a fairly large reel of perhaps 4 or 5 feet in diameter which carries either slats or picker prongs is positioned just forwardly of feed augers 11. The diameter of the reel provides a substantial amount of dead space between the point at which the picker prongs are most closely adjacent the cutter bar and the point at which the picker prongs are next most closely adjacent the feed auger. This area is roughly triangular in shape and is referred herein as dead space inasmuch as grain being fed to the feed augers is not under the control of either the feed augers or the pickers in that space. It is easy for the grain to become disoriented and bunched-up thereby creating substantial amounts of dust and increasing the probability of machine breakdown.

In the present header, it can be seen that with sprocket 16 being of relatively small diameter, the dead space is practically eliminated (FIG. 3). Further, since picker prongs 12 are continually controlled in their disposition by the engagement of cam follower 30 in cam track 31, the dead space can be further reduced by forcing the points of the picker prongs 12 to follow a path which is closely adjacent the limits of feed auger 11 as illustrated in FIG. 3. This assures that the grain being fed into the feed augers is under predetermined control from the time it is first engaged by the picker prongs until it is deposited in the feed auger in a satisfactorily oriented manner.

As the header progressed through a field of grain, that grain which would normally tend to become entangled and hang up on a divider plow is in the case of the present invention cleanly severed by the action of cutter blade 32 thereby eliminating another possible point of malfunction and the destruction of a certain amount of the crop and topsoil. This possible destruction is further reduced by the more compact, limited movement of the cutter bar drive mechanism.

Even a very sturdily built header will tend to vibrate and sway as it is moved through a field. Should such be the case there is a good likelihood that a normal camming pin such as 30 could become disengaged from its cam track. However, in the present header the cam track 31 is so mounted on arms as to yield and sway with the remainder of the header. Further, the channel shape of track 31 prevents the inadvertent withdrawal of the camming pin 30.

In the appended claims, the term grain is used in a broad sense to include all crops grown from the ground on stalks which are capable of being harvested by the device and in the manner above described.

I claim:

1. A header for use in the harvesting of grain, said header being adapted to be operatively connected to separate propelling means for movement thereof through a field of grain, said header including:
  a. a feed auger;
  b. a cutter bar spaced forwardly of said feed auger;
  c. a platform interconnecting said cutter bar and said feed auger over which grain is adapted to pass;
  d. said feed auger, said cutter bar and said platform being supported on related primary frame members;
  e. a first set of sprocket wheels supported for rotation substantially above and normal to said cutter bar in operative relation thereto, at least one wheel of said first set being positioned at substantially each end of said cutter bar;
  f. a second set of sprocket wheels supported for rotation rearwardly of said first set and operatively adjacent said feed auger, the wheels of said set being substantially aligned with the wheels of said first set;
  g. endless chains interconnecting corresponding sprocket wheels of each of said sets thereof;
  h. picker carrying bars mounted on said endless chains for movement therewith around said first and second sets of sprocket wheels
  i. means for rotating said sets of sprocket wheels, said endless chains and said picker carrying bars for engaging and raking grain past said cutter bar, over said platform and into said feed auger.

2. The header of claim 1, in which:
  j. said second set of sprocket wheels is of substantially smaller diameter than said first set and both of said sets are supported relative to each other in such a manner that their lower runs fall into substantially the same plane.

3. The header of claim 1, in which:
  j. said first set of sprocket wheels is adjustably mounted for movement toward and away from said cutter bar.

4. The header of claim 1, in which:
  j. said second set of sprocket wheels is adjustably mounted for movement toward and away from said platform.

5. The header of claim 1, in which:
  j. said sets of sprocket wheels are independently adjustable with respect to said cutter bar, said platform and said feed auger to accommodate grains of differing characteristics.

6. The header of claim 1, in which:
  j. said picker carrying bars are rotatably mounted on said endless chains;
  k. a cam follower extending eccentrically from a corresponding end of each of said bars;
  l. a cam track adapted to be engaged by each of said cam followers, the configuration of said track causing the pickers on each of said bars to be progressively disposed generally vertically as they pass over said cutter bar and said platform, then reach rearwardly somewhat and generally follow the circumferential contour of said feed auger as they move therepast, then to reach upwardly and overly as they pass around said first set of sprocket wheels to generally vertical positions again as they pass over said cutter bar.

7. The header of claim 6, in which:
  m. said cam followers are so received by said cam track as to prevent their withdrawal therefrom upon relative movement between the various parts of the header in operation.

8. The header of claim 6, in which:

m. said cam track is free to sway and move with the remaining parts of said header while in operation.

* * * * *